June 11, 1929.  S. WIECHACZ  1,716,995
AEROPLANE
Filed Sept. 11, 1928

INVENTOR.
Stanley Wiechacz
BY
ATTORNEY

Patented June 11, 1929.

1,716,995

UNITED STATES PATENT OFFICE.

STANLEY WIECHACZ, OF DETROIT, MICHIGAN.

AEROPLANE.

Application filed September 11, 1928. Serial No. 305,182.

This invention relates generally to improvements in aeroplanes and in particular to a pair of propellers rotatively mounted on the landing gear of an aeroplane embodying a manually operated means of pivoting the said propellers in a horizontal position when in flight in combination with a means of driving or rotating the said propellers when in the latter mentioned position so as to permit the said propellers to increase the lifting force of the aeroplane.

The object of the invention is to provide a device of the class described of novel construction and arrangement of parts hereinafter more fully described, claimed and illustrated in the accompanying drawing.

Figure 1:
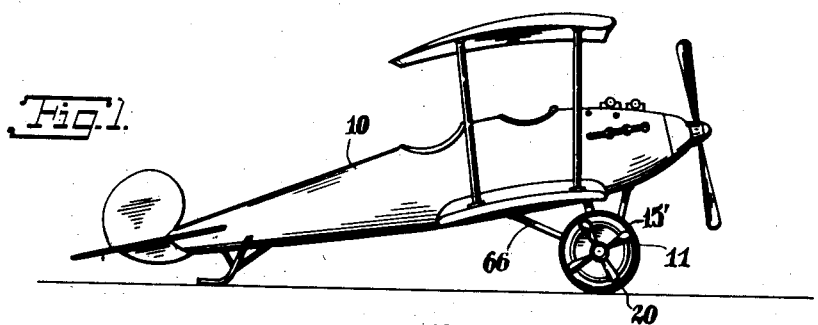
Fig. 1 is a side elevational view of an aeroplane showing my improved device attached to the landing gear as same would appear when on the ground.
Figure 2:
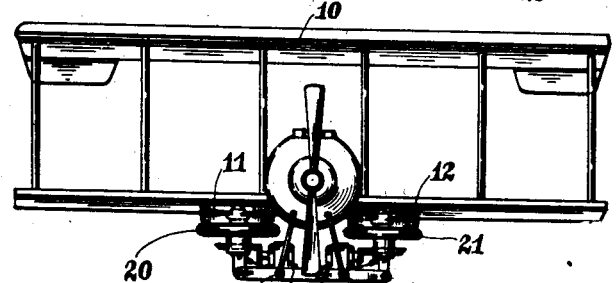
Fig. 2 is a front elevational view thereof, illustrating my improved device as same would appear when the aeroplane is in flight.
Figure 3:
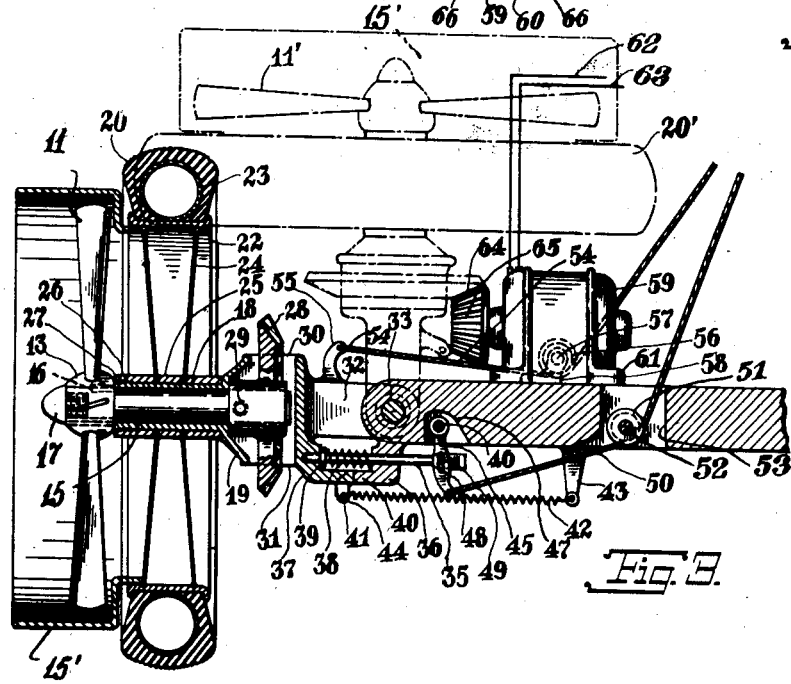
Fig. 3 is an enlarged vertical central sectional view of my improved device.

In Figs. 1 and 2 of the accompanying drawing, I have shown an aeroplane 10 such as used for flying purposes. Although I have illustrated an aeroplane of the biplane type, it is understood that my improved device may be applied to all types and classes of lighter than air flying machines such as generally used for stunt, commercial, photography and all general flying purposes.

As here embodied my improved device comprises a pair of propellers 11 and 12, preferably of the multiply blade type, and which are provided with hubs 13 from which the said blades radiate. The hubs 13 have formed therein axial openings adapted to receive the stub shafts 15, and are secured thereto by a key 16 and a cap 17 threadedly attached to the extremity of the shaft 15. The shaft 15 is rotatively mounted in the extended element 18 of the casing 19.

The usual landing wheels comprise rubber tires 20 and 21 mounted in the usual manner on the rims 22. The tires 20 and 21 are provided with the usual inner tubes 23 for the purpose of providing pneumatic tires as are ordinarily used on aeroplanes. The usual wire spokes 24 are secured to the rim 22 and to the hub 25, which is rotatively mounted on the extended element 18 of the casing 19 and held in place thereon by lock nuts 26 and 27.

The casing 19 has its main portion somewhat enlarged and is of hollow construction adapted to freely receive a bevel gear 28 secured as at 29 by a pin or the like of the stub shaft 15, the casing 19 having formed therein openings 30 and 31 through which the gear 28 extends somewhat.

The casing 19 is provided with extended elements 32 having formed therein apertures adapted to receive a pin 33 which engages in an aperture formed in the extremities of the landing gear shaft 34, as a means of pivotally mounting the casings 19 on the extremities of the landing gear shaft.

A guard 15' of tubular construction is secured to the rim 22 and is extended therefrom and is adapted to enclose the propellers 11 and 12 so as to prevent injury when the said propellers are rotated as hereinafter set forth.

A pin 35 is slidably mounted in the lug element 36 of the landing gear shaft and is normally held in registration with an aperture formed in the lug element 37 of the casing 19 by an expansion spring 38 co-axial on the pin 35 and positioned intermediate the lug element 36 and the collar 39 secured to the said pin. The latter described construction is such as will normally hold the landing wheels in a vertical position as is required when landing and when taking flight.

The lug elements 36 and 37 are provided with extended extremities 40 and 41 respectively which contact or engage each other by means of a tension spring 42 secured to the lug element 43 of the landing gear shaft and to the extended portion 44 of the lug element 37. The latter described construction is such as will align the pin 35 with the aperture formed in the lug element 37 which receives the said pin so as to permit of easy engagement of the said pin. The said spring 42 being also provided to return the landing wheels to a vertical position.

A lever 45 is pivotally mounted on the pin 46 carried in the landing gear shaft 34 which has formed therein a suitable opening 47 adapted to receive the said lever. The lever 45 has formed therein, intermediately an elongated slot 48 adapted to receive the pin 49 secured to and extended from the above mentioned pin 35. A flexible member 50, preferably aeroplane cable is secured to the free extremity of the lever 45 and is extended therefrom over a pulley 51, rotatively mounted on a pin 52 carried in the landing gear shaft 34 which has formed therein an opening 53 adapted to receive the said pulley 51 and the cable 50. The cable 50 is further extended from the pulley 51 within easy and convenient reach of the operator or aviator.

The latter described construction is such as will permit the pin 35 to be slidably disengaged with the aperture formed in the lug element 37 of the casing 19, when the cable 50 is manually pulled by the said aviator, so as to permit of the horizontal pivoting of the said landing wheels and propellers which is accomplished in the hereinafter described manner.

A flexible cable 54 similar to the above mentioned cable 50 is secured to the lug element 55 of the casing 19 and is extended therefrom over a pulley 56 rotatively mounted on the pin 57 carried in the sheave 58 secured to the landing gear shaft 34. The cable 54 is further extended from the pulley 55 within easy reach of the aviator, and has secured thereto at its free extremity a handle, knob or the like adapted to engage in any suitable fixture, not shown in the accompanying drawing, when the said cable is manually pulled by the aviator as a means of pivoting the propellers and landing wheel in a horizontal position as designated by the dot and dash lines 11' and 20'.

Electric motors 59 and 60 are mounted on suitable brackets 61 secured to the landing gear shaft 34 in proximity to the extremities thereof. The electric motors 59 and 60 are operatively connected by means of suitable cables 62 and 63 to any suitable source of electric current preferably a storage battery, not shown in the accompanying drawing, and are also connected to a switch located within easy reach of the aviator of the aeroplane.

Bevel gears 64 are secured to the armature shaft 65 of the above mentioned electric motors and are adapted to engage with the above mentioned gears 28 when the propellers are pivoted in a horizontal position, for the purpose of driving or rotating the said propellers so as to materially increase the lifting power of the said aeroplane.

It is understood that the landing gear shaft 34 is positioned somewhat below the body of the aeroplane as is usual practice and is held in the said position by means of suitable conventional struts 66 or braces secured thereto and to the under portion of the body of the aeroplane.

Having thus described my invention what I claim as new and desire to secure by United States Letters Patent is:

1. In an aeroplane, a pair of propellers rotatively mounted on the casings adapted to rotatively support the landing wheels of the said aeroplane, said casings pivotally attached to the extremities of the landing gear shaft of the said aeroplane, a means of normally holding the said propellers and the said landing wheels in a vertical position by a pin slidably mounted in the said landing gear shaft and engaging in the said casing.

2. In combination with an aeroplane, a pair of propellers rotatively mounted on the casings adapted to rotatively support the landing wheels of the said aeroplane, said casings pivotally attached to the extremities of the landing gear shaft of the said aeroplane, a means of normally holding the said propellers and the said landing wheels in a vertical position by a pin slidably mounted in the said landing gear shaft and engaging in the said casing.

3. In an aeroplane landing gear, a pair of propellers rotatively mounted on the casings adapted to rotatively support the landing wheels of the said aeroplane, said casings pivotally attached to the extremities of the landing gear shaft of the said aeroplane, a means of normally holding the said propellers and the said landing wheels in a vertical position by a pin slidably mounted in the said landing gear shaft and engaging in the said casing.

4. In an aeroplane, a pair of propellers rotatively mounted on the casings adapted to rotatively support the landing wheels of the said aeroplane, said casings pivotally attached to the extremities of the landing gear shaft of the said aeroplane, a means of normally holding the said propellers and the said landing wheels in a vertical position by a pin slidably mounted in the said landing gear shaft and engaging in the said casing, a means of pivoting the said propellers and the said landing wheels in a horizontal position in combination with a means of rotating the said propellers when in a horizontal position for the purpose of increasing the lifting power of the said aeroplane.

5. In combination with an aeroplane, a pair of propellers rotatively mounted on the casings adapted to rotatively support the landing wheels of the said aeroplane, said casings pivotally attached to the extremities of the landing gear shaft of the said aeroplane, a means of normally holding the said propellers and the said landing wheels in a vertical position by a pin slidably mounted in the said landing gear shaft and engaging in the said casing, a means of pivoting the said propellers and the said landing wheels in a horizontal position in combination with a means of rotating the said propellers when in a horizontal position for the purpose of increasing the lifting power of the said aeroplane.

6. In an aeroplane landing gear, a pair of propellers rotatively mounted on the casings adapted to rotatively support the landing wheels of the said aeroplane, said casings pivotally attached to the extremities of the landing gear shaft of the said aeroplane, a means of normally holding the said propellers and the said landing wheels in a vertical position by a pin slidably mounted in the said landing gear shaft and engaging in the said casing, a means of pivoting the said propellers and the said landing wheels in a horizontal position in combination with a means of rotating the said propellers when in a horizontal position for the purpose of increasing the lifting power of the said aeroplane.

In testimony whereof I have affixed my signature.

STANLEY WIECHACZ.